United States Patent [19]

Stanislawczyk

[11] 4,030,323
[45] June 21, 1977

[54] ANTI-THEFT TRANSMISSION LEVER LOCK PLATE

[75] Inventor: John P. Stanislawczyk, Elizabeth, N.J.

[73] Assignee: The Raymond Lee Organization, Inc., New York, N.Y.; a part interest

[22] Filed: Dec. 9, 1975

[21] Appl. No.: 639,053

[52] U.S. Cl. .................................. 70/199; 70/202
[51] Int. Cl.² ........................................ F16H 57/00
[58] Field of Search ............ 70/193, 194, 198, 199, 70/201, 202, 247, 248

[56] References Cited

UNITED STATES PATENTS

| 1,222,456 | 4/1917 | Peake | 70/199 |
| 1,291,617 | 1/1919 | O'Leary et al. | 70/202 |
| 1,329,644 | 2/1920 | VanDeventer et al. | 70/193 X |
| 1,364,539 | 1/1921 | Baker et al. | 70/199 |
| 1,372,597 | 3/1921 | Bowles | 70/199 |
| 1,386,543 | 8/1921 | Tiller | 70/199 |
| 1,402,955 | 1/1922 | Pohl | 70/199 |
| 1,475,863 | 11/1923 | Pate | 70/199 |

FOREIGN PATENTS OR APPLICATIONS

| 275,903 | 8/1927 | United Kingdom | 70/194 |

Primary Examiner—Robert L. Wolfe
Attorney, Agent, or Firm—Howard I. Podell

[57] ABSTRACT

A lock plate assembly that mounts about a pair of transmission gear shift levers of a vehicle to prevent unauthorized use of the vehicle. The lock plate assembly consists of a pair of shaped plates which are shaped to matingly engage with each other, with each plate shaped to fit halfway about two parallel cylindrical rods. An accessory assembly may be mounted to the vehicle floor to permit mounting the lock plate assembly about a shaft on the accessory plate and about one transmission gear shift lever of a vehicle, when so desired.

1 Claim, 7 Drawing Figures

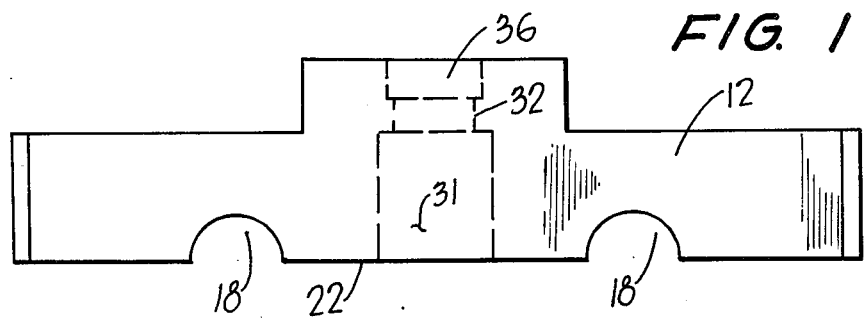
FIG. 1
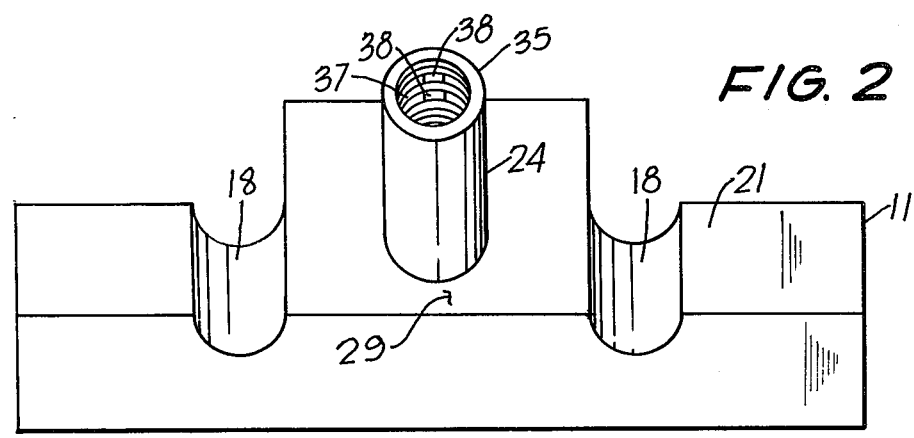
FIG. 2
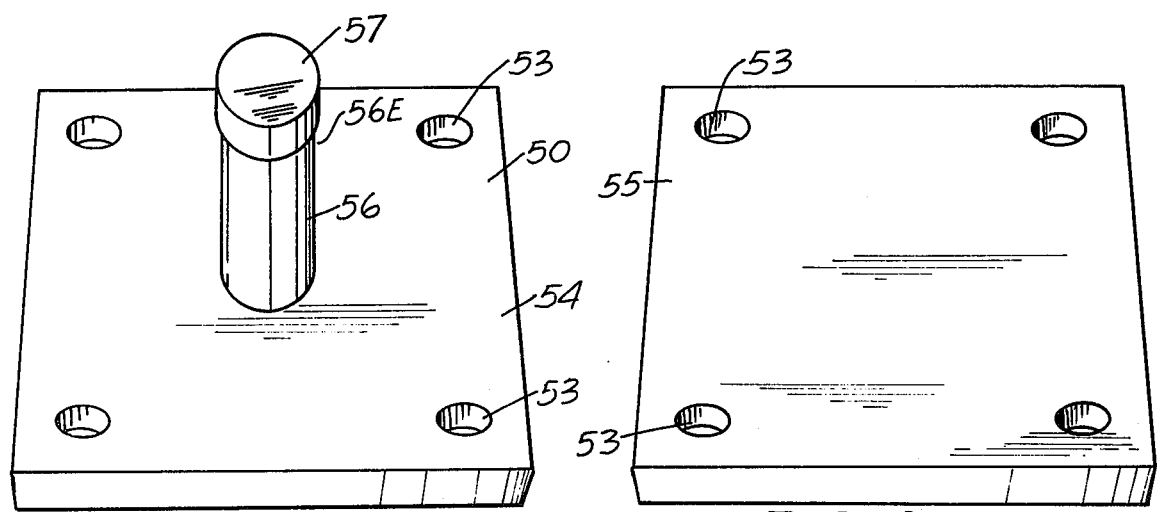
FIG. 3
FIG. 4
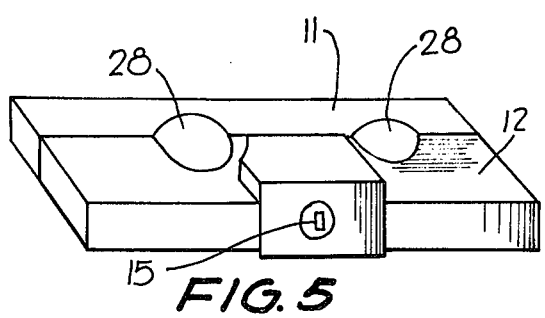
FIG. 5
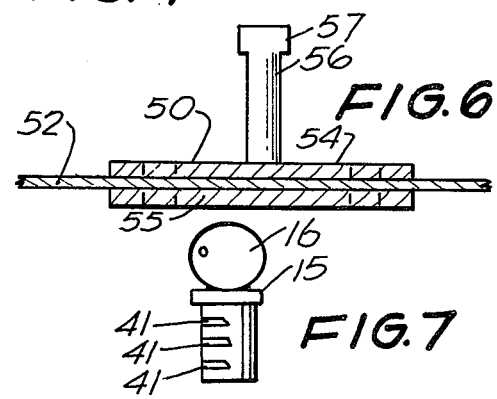
FIG. 6
FIG. 7

ANTI-THEFT TRANSMISSION LEVER LOCK PLATE

SUMMARY OF THE INVENTION:

My invention is a lock plate assembly that mounts about a pair of transmission gear shift levers of a vehicle to prevent unauthorized use of the vehicle. The lock plate assembly consists of a pair of shaped plates which are shaped to matingly engage with each other, with each plate shaped to fit halfway about two parallel cylindrical rods. An accessory assembly may be mounted to the vehicle floor to permit mounting the lock plate assembly about a shaft on the accessory plate and about one transmission gear shift lever of a vehicle, when so desired.

BRIEF DESCRIPTION OF THE DRAWINGS:

The objects and features of the invention may be understood with reference to the following detailed description of an illustrative embodiment of the invention, taken together with the accompanying drawings in which:

FIG. 1 is a side view of the female lock plate;
FIG. 2 is a perspective view of the male lock plate;
FIG. 3 is a perspective view of the auxiliary base plate;
FIG. 4 is a perspective view of the auxiliary floor plate;
FIG. 5 is a perspective view of the lock plate assembly;
FIG. 6 is a side view of the auxiliary base and floor plate assembly; and
FIG. 7 is a side view of the detachable lock tumbler and key.

DESCRIPTION OF THE PREFERRED EMBODIMENT:

Turning now descriptively to the drawings, in which similar reference characters denote similar elements throughout the several views, FIG. 5 illustrates the assembly 10 of the male lock plate 11 and the female lock plate 12 which are held together by lock tumbler 15 to fasten two parallel transmission shafts (not shown) of a vehicle together to prevent shifting of either transmission shaft when the assembly 10 is in the locked position.

Both lock plates 11 and 12 are shaped with a pair of parallel grooves 18 on their respective inner faces 21 and 22, with grooves 18 becoming through holes 28 of the assembly when lock plates 11 and 12 are joined together along the parting line formed by their respective inner faces 21 and 22.

Male lock plate is fitted with a hollow shaft 24 mounted perpendicular to the central section 29 of inner face 21 so as to fit into a mating cylindrical hole 31 in female lock plate 12. Hole 31 is formed with a projecting rib 32 which abuts the exterior end 35 of shaft 24 in the assembled mode with lock tumbler 15 fitting through the open end 36 of hole 31 and the interior hole 37 of shaft 24 in the assembled condition such that lock tumbler latches 41 may engage slots 38 in shaft hole 37 in the locked mode when key 16 is engaged in tumbler 15.

As shown in FIGS. 3, 4 and 6, an auxiliary base plate unit 50 may be fastened to the floor 52 of the vehicle and bolted to an auxiliary floor plate 55 mounted under floor 52 by means of mounting holes 53. A rod 56 is fixed perpendicular to the plate 54 of base plate unit 50 and formed with a cap 57 fixed to the free end 56E of rod 56, with the diameter of cap 57 being larger than the diameter of hole 28 formed in lock assembly 10, and with the diameter of rod 56 less than the diameter of said hole 28 so that lock assembly 10 may be alternately mounted about shaft 56 and one transmission lever of a vehicle in which the base plate unit 50 is installed.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the U.S. is:

1. A detachable lock plate assembly for fitting about a transmission shift lever of a vehicle and a second fixed rod, comprising a male plate member and a female plate member shaped to telescopically join each other in an engaged mode, with each plate member fitted with a pair of parallel grooves that form a pair of parallel through holes when the plate members are joined together, with locking means operated by a removable key that maintains the plates engaged in the locked mode.

said male plate member formed with a tubular shaft that projects perpendicularly from a surface of said member, said shaft being of an external shape to telescopically fit into a through hole that extends from a surface of the female member, with each said surface of each member formed with said parallel grooves, said shaft formed with an open axial hole, the internal surface of which hole is formed with a recess of a shape to engage a latch of said locking means, said locking means consisting of a detachable tumbler that fits into the hole of the female plate member and the hole of the shaft of the male plate member when the two plate members are assembled.

* * * * *